Patented Nov. 14, 1950

2,530,334

UNITED STATES PATENT OFFICE 2,530,334

HYDROLYSIS OF STEROID SEMICARBAZONES

Roland Kapp, Newark, and Richard Griffith, Shrewsbury, N. J., assignors to Nopco Chemical Company, Harrison, N. J., a corporation of New Jersey No Drawing. Application July 23, 1947,
Serial No. 763,166

14 Claims. (Cl. 260—397.4)

1

This invention relates to the purification of steroids, and more particularly it concerns the hydrolysis of semicarbazones of steroids.

In the production of various steroids including sex hormones, cholesterol is the usual starting material from which hormone intermediates are produced in a series of reactions. These intermediates are obtained as mixtures of degradation products, tarry matter and the constituents of a number of hormones. Isolating a specific hormone constituent involves treatment with semicarbazide to form steroid semicarbazones which differ in solubility sufficiently to permit separation by fractional precipitation at various temperatures. Then the desired steroid is reconverted to a ketone by hydrolysis of its semicarbazone. A variety of ways of hydrolyzing these semicarbazones have been proposed but all leave much to be desired. In general numerous reagents have been employed in dilute form thereby necessitating the handling of large volumes of materials. Also a considerable number of operations have been required to separate the hydrolyzed steroid from the products of the hydrolysis reaction.

An example of the state of the art is afforded by the hydrolysis of the semicarbazone of dehydroisoandrosterone acetate. This material is dissolved in a mixture of aqueous acetic acid and benzaldehyde and refluxed; then the products are stirred into a cold aqueous solution of sodium bisulfite to precipitate the steroid ketone or its acetyl derivative and benzaldehyde semicarbazone. After filtering off the solids, the filtrate is discarded and the precipitate washed, dried and extracted with ethylene dichloride. Next the extract is filtered to remove the benzaldehyde semicarbazone precipitate and the solvent evaporated off leaving the steroid ketone as a residue. Since the acetate radical on the steroid is also hydrolyzed to a considerable extent, the residue is dissolved in pyridine, reacetylated with acetic anhydride and precipitated as dehydroisoandrosterone acetate by pouring the reaction products into water. This steroid is purified by filtering and washing followed by recrystallization from an alcohol. In this method, it has not been found commercially feasible to recover that portion of the benzaldehyde which forms an addition product with the sodium bisulfite.

The present discovery of hydrolyzing steroid semicarbazones with an aqueous mineral acid in the presence of a water-immiscible solvent for steroid ketones affords a much simpler, faster and more economical way of accomplishing the same results. Elimination of the treatments with benzaldehyde and sodium bisulfite as well as the attendant steps of filtering, washing, drying and extracting the precipitate with a solvent increases the rate of production of substantially

2 pure steroids 65 per cent or more. In addition greater yields are obtained and the semicarbazide salt may be easily recovered.

An object of the invention is to provide an improved method of hydrolyzing steroid semicarbazones.

A second object of the invention is to provide a simpler and more economical method of hydrolyzing steroid semicarbazones.

A third object of the invention is to provide a method capable of increasing the productive capacity of equipment used in hydrolyzing steroid semicarbazones.

A fourth object of the invention is to provide for the recovery of semicarbazide salts from steroid semicarbazones.

Other objects of the invention will in part be obvious and will in part appear hereinafter.

The present invention concerns the hydrolysis of steroid semicarbazones with an aqueous mineral acid to the corresponding steroid ketones in a reaction medium comprising a water-immiscible liquid organic solvent for the steroid ketones and in which the other reaction products and by-products are substantially insoluble.

The invention accordingly comprises the several steps and the relation of one or more of such steps with respect to each of the others thereof, which will be exemplified in the method hereinafter disclosed, and the scope of the invention will be indicated in the claims.

The acid hydrolysis of steroid semicarbazones in general may be illustrated by the following equation involving a typical substance of that group.

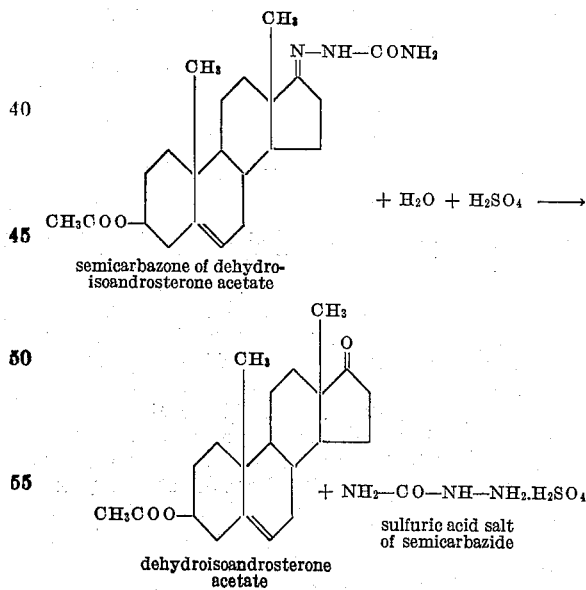

In this reaction, the 3-acetoxy radical on the sterol derivative is split off from some or all of the molecules and replaced by a hydroxyl group in the same position. Although the starting material is not soluble in the water-immiscible solvent, the solvent dissolves the resultant sterol or sterol ester as it forms. However, the semicarbazide salt and any by-products or degradation products are insoluble in the solvent, and since there is only a small quantity of water present in the acid solution, these materials are for the main part precipitated. The progress of the chemical change can readily be determined visually by interrupting the refluxing and agitation and observing the reaction mixture while quiescent. Initially the heterogenous system consists of a milky solvent layer above the acid layer and a layer of solid semicarbazone. Gradually as the semicarbazone is decomposed and the steroid component dissolves, the solvent layer becomes more and more transparent until finally it is merely hazy from the finely divided semicarbazide salt particles in suspension. When reaction is complete, removal of the semicarbazide salt by filtration permits recovery of semicarbazide therefrom in known manner. Next the lower acidic layer of the filtrate is drawn off and the solvent layer evaporated to dryness leaving a steroid ketone residue. The residue is taken up in a mutual solvent for the residue and for acetic anhydride, pyridine being preferred for the purpose, and acetylated with acetic anhydride. Pouring the solution into water causes the precipitation of the crude ketone sterol ester. This substance is filtered, washed and then fractionally recrystallized from a suitable solvent of different nature than the solvent employed as a reaction medium to produce the substantially pure dehydroisoandrosterone acetate in nearly quantitative yields.

The novel process is not limited to semicarbazones of sterol esters but is applicable to sterols and sterol derivatives, that is to steroid semicarbazones in general. Application of the method to hormone esters is currently its greatest utility, since it is conventional to isolate the hormones in ester form. Among the wide variety of steroids with which the method is operative are dehydroisoandrosterone, testosterone, pregnenolone, norcholestenolone, androstenedione, 7-ketocholesterol and the like, and their acetates, propionates, other esters and the like may be mentioned in naming only a few.

Any of the mineral acids, as, for example, sulfuric, hydrochloric, nitric, phosphoric acids, etc., may be used in promoting the hydrolysis. In addition the acid converts the semicarbazide formed during the reaction into the acid salt thereby rendering it insoluble in the water-immiscible solvent. Accordingly the quantity of acid used should be at least sufficient to form the acid addition product of all the semicarbazide released during hydrolysis; and it is desirable to employ about 100% excess acid on this basis. The acid solution should contain more than one mole of water per mole of the steroid semicarbazone to furnish the water required in the reaction and again an excess is preferred. However, great excesses of the acid and water are not recommended as employing large quantities of reactants is uneconomical and reduces the productive capacity of the equipment. Sulfuric acid is the preferred acid as the best results appear to be obtained with this substance, and 50% acid has been found superior to a solution of 10% $H_2SO_4$ content. A quantity of 50% aqueous sulfuric acid equal in weight to the semicarbazone starting material is recommended.

The reaction medium of the present invention may be any water-immiscible halogenated hydrocarbon or aromatic hydrocarbon with a boiling point between 30 and 150° C. Suitable compounds include, inter alia, methylene chloride, chloroform, carbon tetrachloride, ethylene dichloride, 1,1,2-trichloroethane, propyl chloride, propylene dichloride, ethylene dibromide, bromoform, methylene bromide, propyl bromide, benzene, toluene, xylene and the like. All factors being considered, ethylene dichloride is greatly preferred to the other substances listed.

These materials are solvents for steroid ketones but not for semicarbazide acid salts and by-products of the hydrolysis. The quantity of solvent introduced into the reaction mixture should be just sufficient to dissolve all of the ketone reaction product. Although far larger amounts may be used, such practice is uneconomical as it requires handling more materials, reduces the capacity of the equipment and results in greater losses of solvent. In the case of the preferred solvent, ethylene dichloride, it is desirable to add about 7.5 grams per gram of the semicarbazone of dehydroisoandrosterone acetate. The precise quantity of each particular solvent for each specific steroid semicarbazone is determined by the solubility of the corresponding steroid ketone in the selected solvent. To avoid recourse to pressure equipment and also to permit refluxing it is desirable to choose a halogenated or aromatic hydrocarbon of such characteristics that the reflux temperature of the reaction mixture will be at least 50° and not over 100° C.

In reesterifying a steroid ester or esterifying another steroid derivative after hydrolysis, any esterification agent may be employed. Since the acetates and propionates of the hormones are of current importance, acetic and propionic anhydrides or acids are preferred. The esterification is performed in conventional manner in a liquid medium which is a mutual solvent for both the steroid and the esterifying agent. Pyridine is an excellent solvent for this purpose, but other materials such as methylene dichloride, ethylene dichloride, benzene, methyl morpoholine, dimethyl aniline, etc., may be used where desired.

Recrystallization of the crude reaction product is also carried out in known manner. In order to obtain maximum purity the recrystallization solvent selected is usually of different nature than the substance used as a hydrolysis reaction medium. While any solvent for the steroid ketone is suitable, the lower alcohols are preferred, as for example, methanol, ethanol, propanol, isopropanol, butanol and the like.

The present invention may be practiced under subatmospheric or elevated pressures if desired, but it is simpler and cheaper to perform the hydrolysis under atmospheric pressure. A reflux condenser is usually provided in conjunction with a vessel equipped with heating means to minimize the loss of solvent. The reaction temperature should be maintained at 50° C. or above, 80 to 100° C. being preferred, in order to attain a feasible rate of hydrolysis. Temperatures above 100° C. are probably inadvisable as they may induce dehydration of the steroid. Thorough agitation of the reactants is required in order to provide sufficient contact between the acid solution and the insoluble semicarbazone. This stirring may be accomplished entirely by boiling or by mechanical means; but it is preferred to reflux the reaction mixture along with constant stirring because refluxing serves also as an excellent temperature control. Reactions of this type are complete in from ½ to 2 hours; and completion is indicated experimentally by the milky solvent layer becoming transparent and only slightly hazy, the observations of the mass being made while quiescent.

For a fuller understanding of the nature and objects of the invention, reference should be had to the following examples which illustrate the invention. All parts are given in terms of weight unless otherwise stated.

Example I

| | Grams |
|---|---|
| Semicarbazone of dehydroisoandrosterone acetate (technical grade) | 250 |
| Aqueous sulfuric acid (50% $H_2SO_4$) | 250 |
| Ethylene dichloride | 1880 |

The above substances were refluxed in a vessel equipped with a reflux condenser for 1¼ hours with constant stirring. Upon cooling a precipitate formed which was found to consist chiefly of semicarbazide sulfate. The reaction mixture was then stirred and filtered, the filter cake being washed with about 100 grams of ethylene dichloride which was added to the filtrate. This filtrate was allowed to separate into two layers and the lower sulfuric acid layer was drawn off. After washing the ethylene dichloride solution with 500 grams of water and removing the wash water, the solution was evaporated to dryness leaving mushy solids. The solids were then dissolved in 1200 ml. of pyridine, cooled to 10° C. and 200 ml. of acetic anhydride were stirred into the solution. After standing overnight, the pyridine solution was poured into a mixture of ice and water to precipitate the crude dehydroisoandrosterone acetate, stirred 1½ hours and filtered. The filter cake was dried and found to weigh 215.0 grams. Upon recrystallizing this material from 1300 ml. methanol at 5° C. accompanied by the usual filtration and drying operations, 152.4 grams of the substantially pure sterol ester (M. P. 167–169° C.) were obtained in the first crop of crystals. The mother liquor was concentrated to 300 ml. by evaporation and chilled to 5° C. to yield a second crop of crystals melting at 155–164° C. and weighing 12.1 grams. After treatment with semicarbazide, the second crop mother liquor produced 19.9 grams of a third crop of crystals as semicarbazones (M. P. 260–262° C.).

Example II

| | Grams |
|---|---|
| Semicarbazone of dehydroisoandrosterone acetate (purified) | 5.00 |
| Aqueous sulfuric acid (50% $H_2SO_4$) | 5.0 |
| Benzene | 44.0 |

This mixture was refluxed for 1¼ hours with continuous stirring. After cooling, the precipitated semicarbazide salt was filtered off and the precipitate was washed with a small amount of benzene which was then added to the filtrate. Next the acid layer of the filtrate was drawn off and the benzene layer was washed with about 15 ml. of water. The benzene solution was evaporated to dryness and the solids were dissolved in 25 ml. of pyridine. The steroid in the pyridine solution was reesterified by treatment at about 10° C. with 4 ml. of acetic anhydride. Precipitation of the crude dehydroisoandrosterone acetate was accomplished by pouring the solution into a mixture of ice and water and stirring for a substantial period. The product melted at 156–160° C. and weighed 3.27 grams or 77% of theory.

Example III

| | Grams |
|---|---|
| Semicarbazone of dehydroisoandrosterone acetate (technical grade) | 11.16 |
| Concentrated hydrochloric acid (36% HCl) | 4.3 |
| Ethylene dichloride | 88.0 |

The substances listed above were refluxed for 45 minutes in apparatus similar to that employed in Example I. 7.42 grams of material (dry weight) having a melting point of 260–264° C. precipitated when the reaction mixture cooled. This was filtered off; then the ethylene dichloride phase was treated according to the procedure of Example I to produce 4.79 grams of crude dehydroisoandrosterone acetate melting at 152–155° C.

Example IV

| | Grams |
|---|---|
| Semicarbazone of dehydroisoandrosterone acetate (purified) | 10.0 |
| Aqueous sulfuric acid (50% $H_2SO_4$) | 10.0 |
| Ethylene dichloride | 75.0 |

Since the semicarbazone employed in this experiment was prepared by laboratory methods, it was of greater purity than the starting material of the preceding examples. The semicarbazone, solvent and acid were refluxed 2 hours with stirring, then cooled and filtered. The precipitate amounted to 0.897 gram of white solids. After the ethylene dichloride filtrate was washed twice with 25. ml. quantities of water, it was evaporated to dryness. The resulting light yellow solid residue was reacetylated in the same manner as in Example I. Upon precipitating the reesterified material in water and drying, 8.24 grams or 96.5% of theory of the crude steroid acetate with a melting range of 159–164° C. was obtained. Recrystallization from 50 ml. of methanol yielded 6.51 grams of first crop crystals (M. P. 169–170° C.) and 0.74 gram of crystals melting at 162–163° C. in the second crop. Treatment of the resulting mother liquor with semicarbazide was employed to produce a third crop of crystals as semicarbazones weighing 0.40 gram and having a melting point of 268–269° C. The total yield of dehydroisoandrosterone acetate was 85% of the theoretical quantity, or 89% of theory when the third crop of crystals (semicarbazones) was included.

Since certain changes may be made in carrying out the above method without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which as a matter of language might be said to fall therebetween.

Having described our invention, what we claim as new and desire to secure by Letters Patent is:

1. A method for hydrolyzing a steroid semicarbazone selected from the group consisting of semicarbazones of steroids having as the only substituents one hydroxyl group and one keto group, semicarbazones of esters of steroids which steroids have as the only substituents one hydroxyl group and one keto group, and semicarbazones of steroids having as the only substituents two keto groups, which method comprises hydrolyzing the steroid semicarbazone with an aqueous mineral acid solution to the corresponding steroid ketone in a reaction medium comprising a water-immiscible liquid organic solvent for the steroid ketone and in which the resulting semicarbazide salt and reaction by-products are substantially insoluble, said solvent being selected from the group consisting of aromatic hydrocarbons and halogenated aliphatic hydrocarbons.

2. The method of claim 1 in which the steroid semicarbazone comprises a semicarbazone of a testosterone ester.

3. The method of claim 1 in which the steroid semicarbazone comprises a semicarbazone of a pregnenolone ester.

4. The method of claim 1 in which the steroid semicarbazone comprises a semicarbazone of a dehydroisoandrosterone ester.

5. The method of claim 1 in which the steroid semicarbazone comprises a semicarbazone of dehydroisoandrosterone acetate.

6. The method of claim 1 in which the steroid semicarbazone comprises a semicarbazone of dehydroisoandrosterone acetate and the water-immiscible solvent comprises ethylene dichloride.

7. The method of claim 1 in which the water-immiscible organic solvent comprises an aromatic hydrocarbon having a boiling point between 30 and 150 degrees centigrade.

8. The method of claim 1 in which the water-immiscible organic solvent comprises a halogenated hydrocarbon having a boiling point between 30 and 150 degrees centigrade.

9. The method of claim 1 in which the water-immiscible organic solvent comprises ethylene dichloride.

10. The method of claim 1 and the additional steps which comprise removing the water-immiscible solution from the reaction mass and evaporating the water-immiscible solvent leaving a steroid ketone residue.

11. The method of claim 10 and the additional steps which comprise esterifying the steroid ketone and recrystallizing the keto-steroid ester from a second and different solvent therefor.

12. The method of claim 11 in which the steroid semicarbazone comprises a semicarbazone of an ester of dehydroisoandrosterone and the water-immiscible organic solvent comprises a halogenated hydrocarbon.

13. A method which comprises hydrolyzing the semicarbazone of dehydroisoandrosterone acetate with an aqueous mineral acid solution to the corresponding steroid ketone in the presence of a quantity of ethylene dichloride sufficient to dissolve substantially all of the steroid ketone, separating the ethylene dichloride from the reaction mixture, evaporating the ethylene dichloride to leave a residue of the steroid ketone, acetylating the steroid ketone, and recrystallizing the dehydroisoandrosterone acetate from a second and different solvent therefor.

14. A method according to claim 13 in which the temperature is maintained between 50 and 100 degrees centigrade during hydrolysis, the acid solution comprises sulfuric acid and the second solvent comprises methanol.

ROLAND KAPP.
RICHARD GRIFFITH.

REFERENCES CITED

The following references are of record in the file of this patent:

UNITED STATES PATENTS

| Number | Name | Date |
| --- | --- | --- |
| 2,161,389 | Ruzicka | June 6, 1939 |
| 2,165,655 | Ruzicka | July 11, 1939 |
| 2,323,584 | Schoeller | July 6, 1943 |

OTHER REFERENCES

Sobotka, Chemistry of the Sterids, page 133 (1938).